United States Patent
Esposito et al.

(10) Patent No.: US 10,844,494 B2
(45) Date of Patent: Nov. 24, 2020

(54) MEMBRANELESS ELECTROCHEMICAL FLOW-THROUGH REACTOR

(71) Applicants: Daniel Vincent Esposito, New York, NY (US); Glen Daniel O'Neil, Montclair, NJ (US)

(72) Inventors: Daniel Vincent Esposito, New York, NY (US); Glen Daniel O'Neil, Montclair, NJ (US)

(73) Assignee: The Trustees of Columbia University in the City of New York, New York, NY (US)

( * ) Notice: Subject to any disclaimer, the term of this patent is extended or adjusted under 35 U.S.C. 154(b) by 39 days.

(21) Appl. No.: 15/269,804

(22) Filed: Sep. 19, 2016

(65) Prior Publication Data

US 2017/0081770 A1    Mar. 23, 2017

Related U.S. Application Data

(60) Provisional application No. 62/220,707, filed on Sep. 18, 2015, provisional application No. 62/303,912, filed on Mar. 4, 2016.

(51) Int. Cl.
  *C25B 1/34* (2006.01)
  *C25B 11/03* (2006.01)
  *C25B 15/08* (2006.01)

(52) U.S. Cl.
  CPC .............. *C25B 1/34* (2013.01); *C25B 11/035* (2013.01); *C25B 15/08* (2013.01)

(58) Field of Classification Search
  CPC .......... C25B 1/34; C25B 15/08; C25B 11/035
  See application file for complete search history.

(56) References Cited

U.S. PATENT DOCUMENTS

| | | | |
|---|---|---|---|
| 1,771,091 A | 7/1930 | Lawaczeck | |
| 4,377,455 A * | 3/1983 | Kadija | C25B 11/03 204/258 |
| 4,627,897 A | 12/1986 | Tetzlaff et al. | |
| 4,841,731 A | 6/1989 | Tindell | |
| 5,114,547 A | 5/1992 | Ullman | |

(Continued)

OTHER PUBLICATIONS

"Performance and Economic Outlook of a Membraneless Alkaline Electrolyser," Hydrox Holdings Ltd, WHTC2015, Sydney, Australia, North-West University.
Ferrigno, R., et al., "Membraneless Vanadium Redox Fuel Cell Using Laminar Flow," J. Am. Chem. Soc. 2002, 124, 12930-12931.
Braff, W.A., et al., "Membrane-less hydrogen bromine flow battery," Department of Mechanical Engineering, Massachusetts Institute of Technology, Cambridge, MA, Apr. 4, 2014.

(Continued)

*Primary Examiner* — Louis J Rufo
(74) *Attorney, Agent, or Firm* — Murtha Cullina LLP; Anthony P. Gangemi

(57) ABSTRACT

Methods and systems for electrochemically producing at least one product are disclosed. In some embodiments, the systems include a membraneless electrochemical flow-through reactor. A pair of porous electrodes configured at an angle to each other is disposed within the reactor in a channel of flowing electrolyte including a target reactant. As the electrolyte stream flows through the porous electrodes, a voltage is applied across the electrodes, resulting in the generation of a catholyte effluent stream and an anolyte effluent stream Gaseous and/or liquid products may then be separated from these streams. The membraneless electrochemical flow-through reactor is an easy to design and assemble apparatus for a variety of electrochemical processes.

12 Claims, 15 Drawing Sheets

(56) References Cited

U.S. PATENT DOCUMENTS

| | | | |
|---|---|---|---|
| 5,279,260 | A | 1/1994 | Munday |
| 5,534,120 | A | 7/1996 | Ando et al. |
| 5,865,966 | A | 2/1999 | Watanabe et al. |
| 6,471,873 | B1 * | 10/2002 | Greenberg .......... C02F 1/46109 210/702 |
| 6,719,893 | B2 * | 4/2004 | Sakakibara ............. C02F 1/463 205/742 |
| 7,439,047 | B2 | 10/2008 | Rozendal et al. |
| 7,510,640 | B2 | 3/2009 | Gibson et al. |
| 7,645,931 | B2 | 1/2010 | Gibson et al. |
| 2003/0006136 | A1 | 1/2003 | Hiki et al. |
| 2004/0168909 | A1 * | 9/2004 | Larson ...................... C25B 9/04 204/233 |
| 2006/0210867 | A1 | 9/2006 | Kenis et al. |
| 2009/0025315 | A1 | 1/2009 | Gutfleisch |
| 2013/0175180 | A1 | 7/2013 | Esposito et al. |
| 2015/0034493 | A1 | 2/2015 | Anagnostopoulos |

OTHER PUBLICATIONS

Braff, W.A., et al., "Numerical and Analytical Modeling of a Membraneless Hydrogen Bromine Laminar Flow Battery," The Electrochemical Society, 53 (7) pp. 51-62, 2013.

Alkire, R., et al., "Two-Dimensional Current Distribution Within a Packed-Bed Electrochemical Flow Reactor," Electrochemical Science and Technology, vol. 121, No. 1, pp. 95-103, Jan. 1974.

Alkire, R., et al., "Flow-Through Porous Electrodes," Electrochemical Science and Technology, vol. 122, No. 12, pp. 1594-1601, Dec. 1975.

Alkire, R., et al., "Studies on Flow-By Porous Electrodes Having Perpendicular Directions of Current and Electrolyte Flow," Electrochemical Science and Technology, vol. 124, No. 8, pp. 1220-1227, Aug. 1977.

* cited by examiner

MEMBRANELESS ELECTROCHEMICAL FLOW-THROUGH REACTOR

CROSS REFERENCE TO RELATED APPLICATION(S)

This application claims the benefit of U.S. Provisional Application No. 61/220,707, filed Sep. 18, 2015, and U.S. Provisional Application No. 61/303,912, filed Mar. 4, 2016, which are incorporated by reference as if disclosed herein in their entirety.

BACKGROUND

Electrolysis is a very important industrial process used to produce a variety of vital chemical building blocks. Processes such as the chlor-alkali process, electro-synthesis of anthraquinone, and electro-fluoridation all play essential roles in the production of chemicals used in our everyday lives. Electrolysis can be an energy efficient process with a significantly lower carbon footprint compared to traditional thermal catalysis processes if the input electricity is derived from a renewable resource such as wind or solar. As of 2006, chemical production by electrochemical processes made up more than 6% of the total electrical generating capacity of the United States, with the most energy intensive process as being performed by the chlor-alkali industry. These processes are used to produce hydrogen gas, caustic soda (sodium hydroxide), and chlorine gas. For the chlor-alkali processes, and most electrolysis processes, the economics are dominated by the cost of electricity, which accounts for a significant fraction of the total manufacturing cost. However, the decreasing costs of electricity from renewable resources and the continued adoption of time-of-use pricing schemes are likely to change the economics of electrochemical processes, shifting importance towards decreasing the capital cost of the electrolyzer system itself.

The process chemistry of the chlor-alkali process is relatively simple but the operational and reactor design issues are vastly complex. The most energy efficient electrolyzer in the chlor-alkali industry is the membrane electrolyzer. The membrane electrolyzer functions by separating anolyte and catholyte streams by means of an ion selective membrane and that only allows cationic species (e.g. $Na^+$, $K^+$, $H^+$) and small amounts of water to pass through it. Diaphragm electrolyzers and mercury electrolytic cells are also used to produce bases, although these technologies are being phased out in favor of membrane reactors. This is due to health and environmental concerns relating to the use of asbestos and mercury, respectively. Key challenges with membrane electrolyzers include the high cost of the ion-selective membranes and their susceptibility to fouling. Various approaches have been pursued in order to improve the yield, energy efficiency, economics, and environmental impacts of the membrane process.

What is desired, therefore, is the development of simple, scalable, and efficient electrolysis devices that are suitable for a variety of electrochemical processes. Such devices would greatly reduce material costs at least in part by eliminating the material costs associated with membranes complex manufacturing, and simplify device design and ease of assembly.

SUMMARY

Membraneless electrolyzers based on flow-through mesh electrodes were systematically investigated as a means of simultaneously producing hydrogen, acid, and base. Unlike traditional chlor-alkali electrolyzers, which use diaphragms or ion-selective membranes to separate products, this design employs flow-induced product separation in conjunction with porous mesh flow-through electrodes to separate oxidation and reduction products. In some embodiments, the electrolyzer includes a 3D printed reactor body. In some embodiments, the reactor is fabricated out of poly (lactic acid) (PLA). By systematically varying the electrolyte flow rate and operating current, it is shown that these electrolyzers are well-suited to achieve excellent control over the pH of the cathode and anode effluent streams. Starting with pH neutral 1 M brine ($KNO_3$ or $Na_2SO_4$), pH differences as high as 10 pH units were produced between the product streams. The reactors consistent with embodiments of the present disclosure enable innovative membraneless electrolysis strategies for low-cost and efficient production of a variety of chemicals in which alkaline and/or acidic environments are required.

The reactors of the present disclosure substantially decrease both material and assembly cost while also enabling co-production of acid, base, and $H_2$. These electrolyzers operate without membranes due to the use of angled flow-through electrodes combined with flow-induced separation of products before they can cross over between anolyte and catholyte effluent streams. In some embodiments, the electrochemical reactors of the present disclosure are comprised of only three required components: the anode, cathode, and cell body. The simplicity of this design allows it to be fabricated by low-cost manufacturing techniques (e.g. injection molding) and thereby offers great promise for decreasing the capital costs associated with electrolysis processes.

Acids and bases are formed by varying the current densities through the electrodes and the flow rate of the electrolyte through the flow cell. The electrolyte for these experiments were adjusted to a near-neutral pH. pH values as low as 3 and as high as 12 are achievable at a current density of 208 mA $cm^{-2}$. The pH of the downstream channels of the electrolyzer can be predicted by using Faraday's law of electrolysis and measurements were reproducible. The product crossover of the cell was measured visually by colorimetry using a universal pH indicator. The results of this investigation indicated low product crossover in this electrolyzer and also confirmed the pH readings by the pH meter. This electrolyzer provides a cheaper alternative to producing acid and base with low CO2 emissions when powered by a renewable energy source.

In some embodiments, the present disclosure is directed to an electrochemical flow-through reactor comprising a channel for containing and directing a flow of at least one matter stream, wherein the at least one matter stream includes at least one reactant, and at least two oblique electrodes positioned at a location within the channel, wherein the at least two oblique electrodes are porous, in fluid communication with the matter stream, and arranged within the channel such that the matter stream flows through the at least two electrodes. In some embodiments, the at least two electrodes are at least one anode and at least one cathode. In some embodiments, the angle between the at least two oblique electrodes is selected from the group consisting of: 180°, 90°, 60°, and 30°.

In some embodiments, the electrochemical flow-through reactor comprises a divider downstream of the at least one anode and the at least one cathode. In some embodiments, a plurality of electrochemical flow-through reactors are arranged in series and in fluid communication. In some embodiments, at least one electrode includes a catalyst. In some embodiments, at least one electrode is mesh shaped as a ring, wire, disk, band, or plate.

In some embodiments, the electrochemical reactor comprises an anolyte product collector and a catholyte product collector in fluid communication with the channel. In some embodiments, the channel has an annular conformation comprising a porous central conduit and an outer wall, wherein the at least two oblique electrodes are disposed between the central conduit and the outer wall. In some embodiments, the matter is selected from the group consisting of: gas, liquid, and mixed-phase electrolyte. In some embodiments, the matter is an electrolyte.

In some embodiments, the present disclosure is directed to a method of electrochemically producing at least one product comprising the steps of providing a channel, flowing a matter stream including at least one reactant through the channel, providing at least two electrodes within the channel and in fluid communication with the matter stream, wherein the at least two electrodes are porous, applying a voltage across the at least two electrodes, flowing the matter stream through the porous electrodes, and isolating an effluent stream enriched for the at least one reactant.

In some embodiments, the method further comprises providing a divider downstream from the at least two electrodes, wherein the divider separates a first effluent stream from a second effluent stream. In some embodiments, the method further comprises recovering an amount of the at least one reactant from at least one of the first effluent stream and the second effluent stream as an at least one product. In some embodiments, the method further comprises recycling the matter stream after recovering the at least one product. In some embodiments, the flow is pulsed. In some embodiments, the voltage is pulsed.

In some embodiments, the present disclosure is directed to an electrolyzer system comprising an electrolyte reservoir, a reactant reservoir, a flow-through reactor comprising a channel for containing and directing a flow of the at least one electrolyte stream through at least two oblique electrodes, at least one inlet stream in upstream fluid communication with the electrolyte reservoir and the reactant reservoir and in downstream fluid communication with the flow-through reactor, an electrolyte stream comprising at least one electrolyte and at least one reactant, a first effluent stream, a second effluent stream, and an electrolyte recycle stream in fluid connection with the first effluent and the second effluent streams.

In some embodiments, the first effluent stream includes a catholyte product and the second effluent stream includes an anolyte product. In some embodiments, the electrolyzer system further comprises at least one liquid/gas separator configured to produce at least one product stream, wherein the product in the at least one product stream is selected from the group consisting of: the catholyte product and the anolyte product.

In some embodiments, the channel has an annular conformation comprising a porous central conduit and an outer wall, wherein the at least two oblique electrodes are disposed between the central conduit and the outer wall.

BRIEF DESCRIPTION OF THE DRAWINGS

The drawings show embodiments of the disclosed subject matter for the purpose of illustrating the invention. However, it should be understood that the present application is not limited to the precise arrangements and instrumentalities shown in the drawings, wherein.

DETAILED DESCRIPTION

Figure 1A:
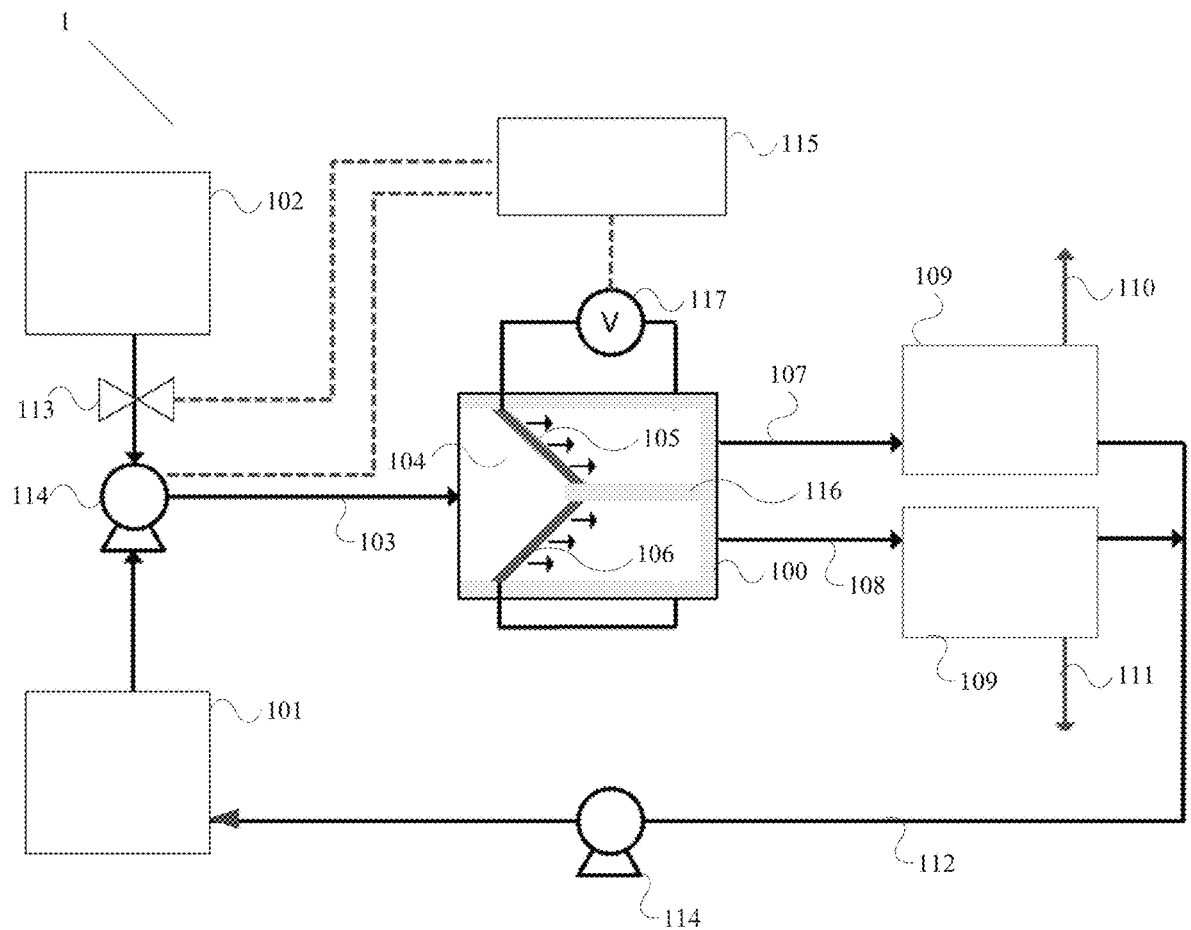
FIG. 1A is a schematic diagram of a system incorporating a membraneless electrochemical flow-through reactor according to some embodiments of the disclosed subject matter.

Referring to FIG. 1A, aspects of the disclosed subject matter include an electrolyzer system 1 including a membraneless electrochemical flow-through reactor 100. In some embodiments, electrolyzer system 1 comprises an electrolyte reservoir 101. In some embodiments, electrolyzer system 1 comprises a reactant reservoir 102. As used herein, electrolytes for use in electrolyzer system 1 include any electrolyte suitable to facilitate a desired electrochemical reaction. In sonic embodiments, the reactant is a composition of matter that includes a target product. In some embodiments, the target product is obtained as a liquid. In some embodiments, the target product is obtained as a gas. In some embodiments, the target product is obtained as a solid.

In some embodiments, electrolyzer system 1 comprises at least one inlet stream 103. In some embodiments, the flow rate of at least one inlet stream 103 is substantially constant. In some embodiments, the flow rate of at least one inlet stream 103 is pulsed. At least one inlet stream 103 comprises matter to be reacted in membraneless electrochemical flow-through reactor 100. In some embodiments, at least one inlet stream 103 comprises at least one electrolyte. In some embodiments, at least one inlet stream 103 comprises at least one reactant. In some embodiments, the reactant is water. In some embodiments, at least one inlet stream 103 comprises at least one electrolyte and at least one reactant.

In some embodiments, at least one inlet stream 103 enters membraneless electrochemical flow-through reactor 100 and flows along a channel 104. In some embodiments, the size and shape of channel 104 are any size and shape suitable to convey at least one inlet stream 103 to electrodes 105 and 106. In some embodiments, at least one of electrodes 105 and 106 is a cathode. In some embodiments, at least one of electrodes 105 and 106 is an anode. In some embodiments, at least one of electrodes 105 and 106 are porous. The following description refers to an exemplary embodiment of the instant disclosure where electrode 105 is the cathode and electrodes 106 is the anode, though the designation of 105 as the cathode and 106 as the anode is intended to be non-limiting. In some embodiments, system 1 includes multiple pairs of electrodes 105 and 106. Designs incorporating multiple pairs of electrodes can benefit from higher efficiency evolution of target product. Increasing the contact area between at least one inlet stream 103 and electrodes 105 and 106 results in corresponding increases in product evolution and output. Thus, membraneless electrochemical flow-through reactor 100 is advantageously scalable by simply increasing the total area of the electrodes. In some embodiments, electrodes are stacked to enable inducing higher current densities through the electrodes. In some embodiments, at least one electrode includes electrodeposited platinum on titanium.

In some embodiments, at least one inlet stream 103 flows through at least one of cathode 105 and anode 106. When a voltage is applied across cathode 105 and anode 106 as at least one inlet stream 103 flows through those electrodes, a redox reaction occurs resulting in the generation of catholyte at cathode 105 and anolyte at anode 106. In some embodiments, the applied voltage is substantially constant. In some embodiments, the applied voltage is pulsed. In some embodiments, the voltage is applied by power source 117. In some embodiments, channel 104 includes a divider 116 positioned to facilitate separation of a catholyte effluent stream 107 and an anolyte effluent stream 108. In some embodiments, the divider is at least 1 mm thick. In some embodiments, the divider is any suitable shape to facilitate separation of catholyte effluent stream 107 and anolyte effluent stream 108 downstream of electrodes 105 and 106 while limiting crossover between the effluent streams.

In some embodiments, system 1 includes at least one sensor. In some embodiments, the sensor is upstream of electrodes 105 and 106. In some embodiments, the sensor is downstream of electrodes 105 and 106. In some embodiments, the at least one sensor is a chemical, electrochemical, mechanical, or physical sensor, and combinations thereof and the like. In some embodiments, the sensor, is a pH sensor, In some embodiments, catholyte effluent stream 107 is enriched for a catholyte. In some embodiments, anolyte effluent stream 108 comprises a base. In some embodiments, anolyte effluent stream 108 is enriched for an anolyte. In some embodiments, anolyte effluent stream 108 comprises an acid. In some embodiments, catholyte effluent stream 107 comprises a first product 110. In some embodiments, anolyte effluent stream 108 comprises a second product 111. In some embodiments, the products are isolated from the effluent streams with separators 109.

In some embodiments, electrolyzer system 1 includes a recycle stream 112 for recycling electrolyte solution from membraneless electrochemical flow-through reactor 100 to electrolyte reservoir 101. In some embodiments, electrolyzer system 1 includes a plurality of pumps 114 to move matter streams throughout the system. In some embodiments, a valve 113 controls flow of reactant to at least one inlet stream 103. In some embodiments, electrolyzer system 1 includes a controller 115. In some embodiments, controller 115 controls at least one of reactant flow rate, reactant concentration, pulse time, sensors, and the like.

Figure 1B:
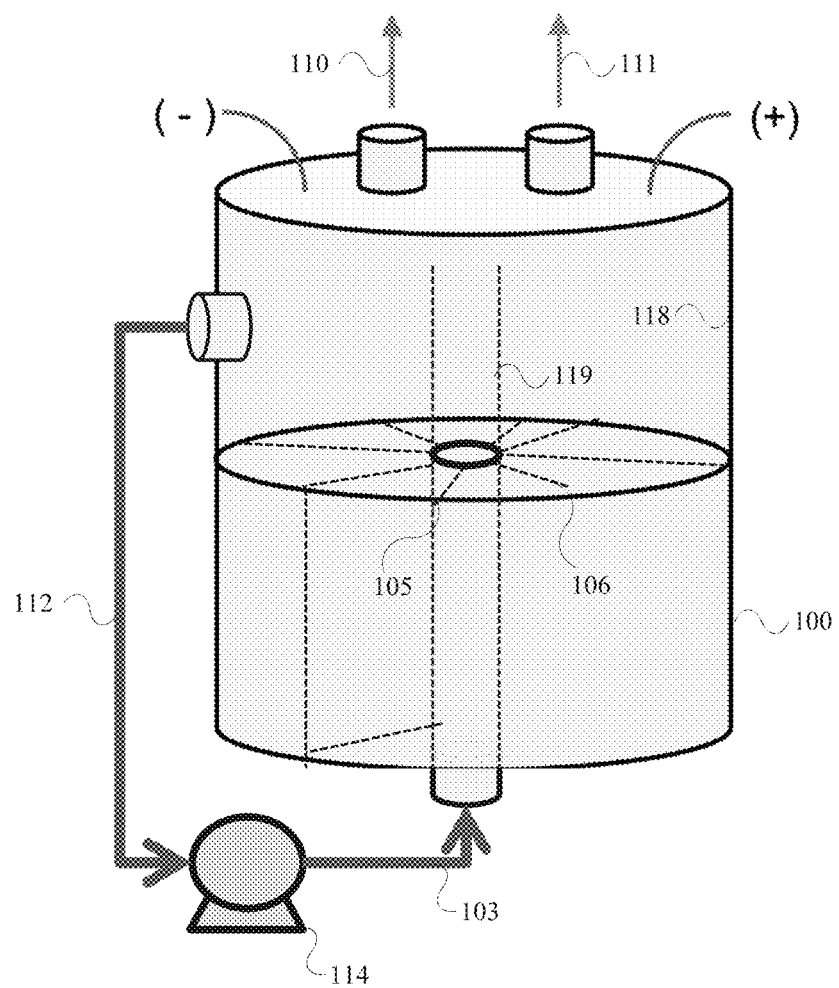
FIG. 1B is a schematic diagram of a membraneless electrochemical flow-through reactor according to some embodiments of the disclosed subject matter.
Figure 2:
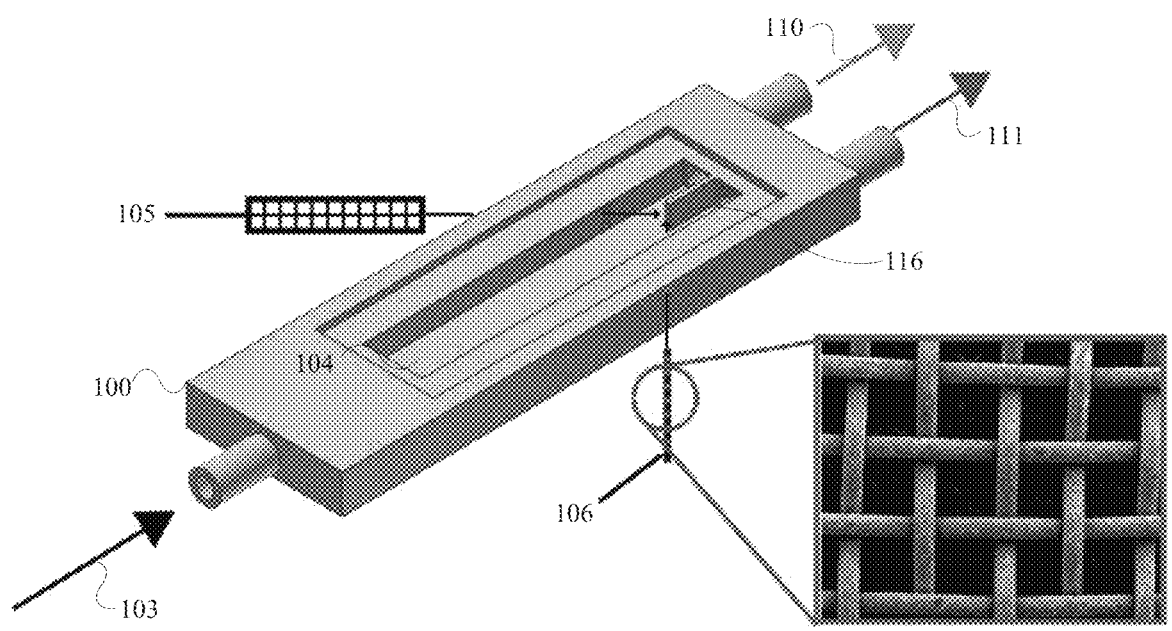
FIG. 2 is a schematic diagram of a membraneless electrochemical flow-through reactor according to some embodiments of the disclosed subject matter.

FIGS. 1B and 2 provide more detailed views of membraneless electrochemical flow-through reactor 100 consistent with some embodiments of the present disclosure. Referring to FIG. 1B, in some embodiments the membraneless electrochemical flow-through reactor 100 comprises a central conduit 119 into which at least one inlet stream 103 enters reactor 100. In some embodiments, central conduit 119 is porous. In some embodiments, the reactor comprises an outer wall 118. In some embodiments, electrodes 105 and 106 are disposed between the outer wall 118 and central conduit 119. In some embodiments, at least one inlet stream 103 flows out of porous central conduit 119 and into the space between the central conduit 119 and outer wall 118 where it flows through electrodes 105 and 106. In some embodiments, in such a configuration, product streams 110 and 111 exit near the top of reactor 100. This is particularly advantageous for collecting a product stream wherein the product is a gas. This embodiment (and others) also allows for scalability of the reactor simply by including more electrode area into the volume of the reactor. In some embodiments, electrodes 105 and 106 extend radially from the central conduit 119 towards outer wall 118.

Referring to FIG. 2, in some embodiments the channel is polyhedral or another shape to facilitate flow of at least one inlet stream 103 to electrodes 105 and 106. In some embodiments, at least a portion of reactor 100 is substantially transparent, allowing flow through the reactor to be viewed and/or imaged from outside the reactor. In some embodiments, at least two reactors 100 are incorporated into system 1. In some embodiments, the at least two reactors 100 are placed in series. In some embodiments, the at least two reactors 100 are placed in parallel. An exemplary embodiment of at least two reactors 100 (three in total in this case) is incorporated into a system 1 is portrayed in FIG. 11. As shown in graph b of this figure, additional reactors 100 produce increased electrolysis current within system 1.

Figure 3A:
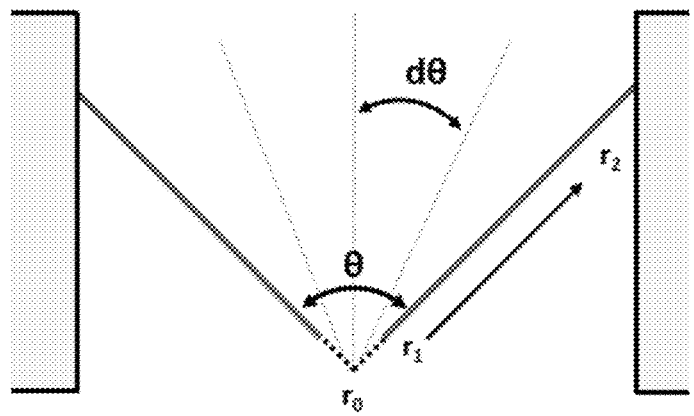
FIG. 3A is schematic diagram of oblique electrodes included in a membraneless electrochemical flow-through reactor according to some embodiments of the disclosed subject matter.

Referring again to FIG. 2, as discussed above, in some embodiments, cathode 105 and anode 106 are porous. In some embodiments, the electrodes are mesh. In some embodiments, at least one electrode is shaped as a ring, band, wire, disk, or plate. Referring to FIGS. 1A, 2, and 3A, in some embodiments, electrodes 105 and 106 are disposed obliquely relative to each other within channel 104. The angle between electrodes 105 and 106 in present disclosure is defined as angle $\Theta$. By decreasing the angle between the electrodes, the distance between them decreases, and as a result the uncompensated solution resistance decreases. In some embodiments, angle $\Theta$ is selected from the group consisting of: 180°, 90°, 60°, and 30°.

Figure 3B:
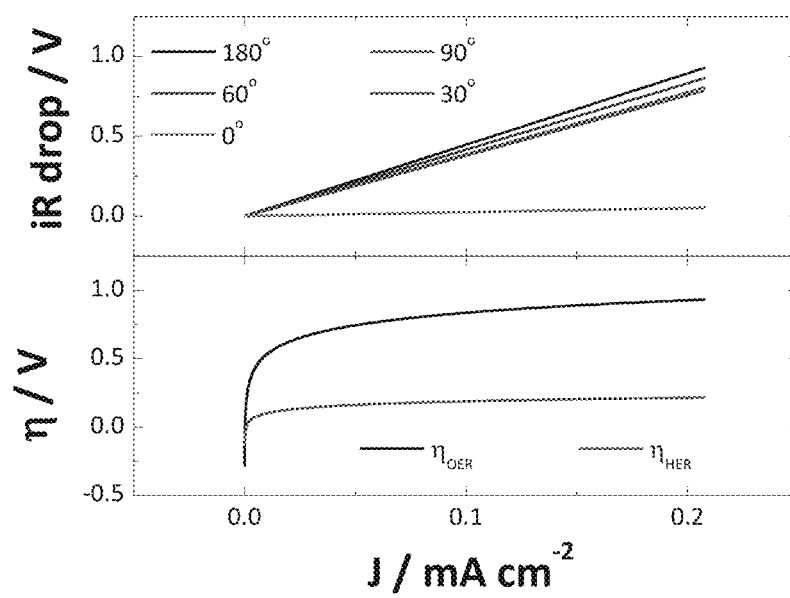
FIGS. 3B-3C portray the effects of varying electrode angle $\Theta$ a membraneless electrochemical flow-through reactor according to some embodiments of the disclosed subject matter.
Figure 3C:
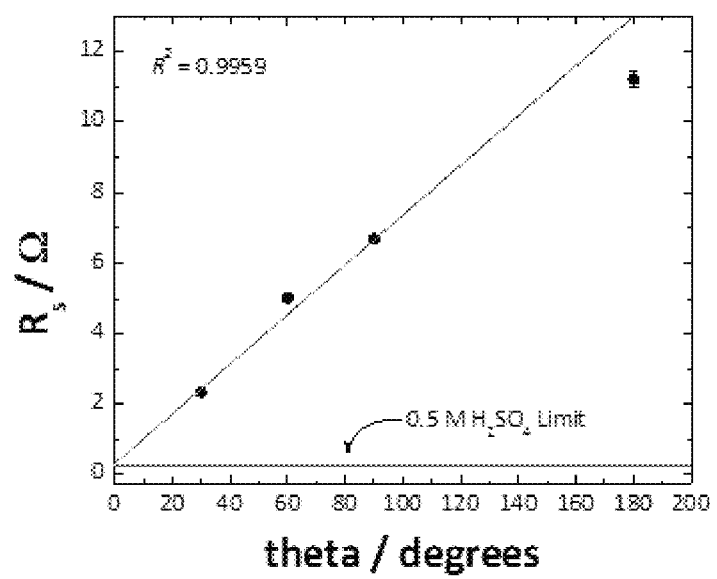

Referring to FIG. 3C, which shows a plot of the uncompensated solution resistance versus the angle between the two electrodes. As predicted, the angle between the electrodes significantly affects the measured resistance, which is a result of the increased electrode area as well as the decreased average distance between the two electrodes. The resistance decreases as the angle between electrodes decreases. A linear regression of the data in FIG. 3C shows a very strong correlation ($R^2$=0.996), suggesting that the resistance can be further decreased by decreasing the angle. Also shown in FIG. 2A is the solution resistance limit for a 0.5 M $H_2SO_4$ solution separated by a 0.1 cm spacing (Rs=025Ω) at 100 kHz which agrees well with the intercept of the linear regression (Rs=0.32Ω).

Figure 4:
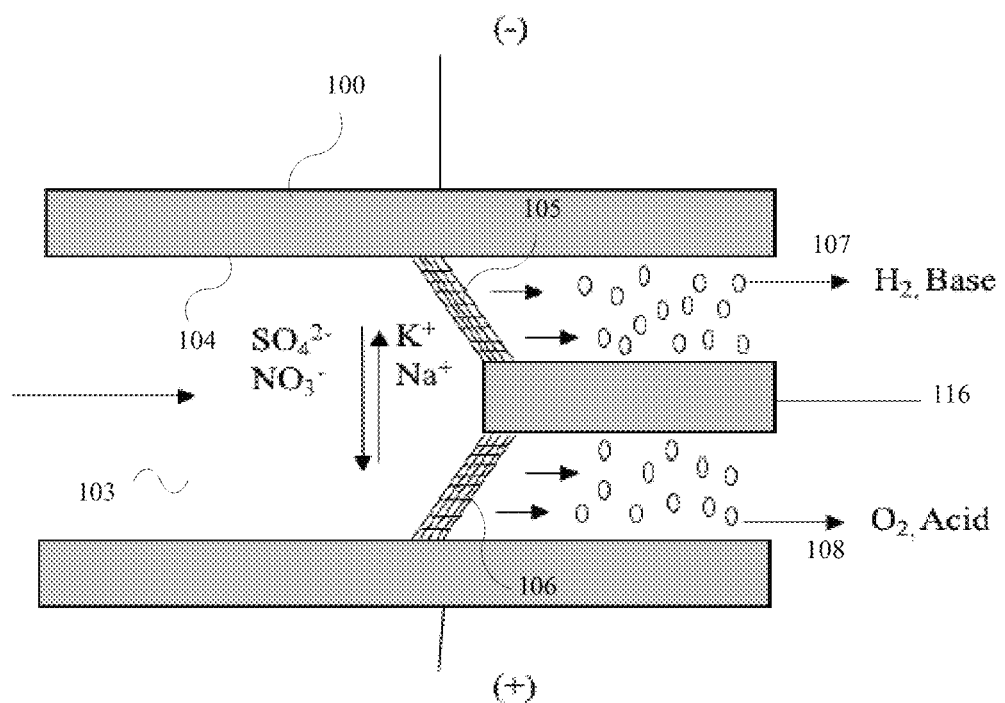
FIG. 4 is a schematic diagram of catholyte and anolyte effluent stream separation by a membraneless electrochemical flow-through reactor according to some embodiments of the disclosed subject matter.

One important advantage of membraneless electrolyzers is that they can be electrolyte agnostic so long as the electrolyte possesses sufficient ionic conductivity to maintain acceptable ohmic solution losses. In the following example, the versatility of the membraneless electrolyzer to operate in potassium nitrate ($KNO_3$) and sodium sulfate ($Na_2SO_4$) brine solutions is demonstrated, which allows for simultaneous production of acid and base. As illustrated in FIG. 4, $H_2$ and base (NaOH or KOH) are produced at the cathode of this electrolyzer (Eq.1), oxygen and acid are produced at the anode (Eq. 2). Also illustrated in FIG. 4, electro-neutrality is maintained by the migration of cations ($K^+$ in KNO3 or $Na^+$ in $Na_2SO_4$) to the cathode and anions ($NO^{3-}$ in $KNO_3$ or $SO_4^{2-}$ ions in $Na_2SO_4$) to the anode.

$$2H_2O+2e^-\leftrightarrow H_2+2OH^- \qquad (1)$$

$$2H_2O\leftrightarrow 4H^++O_2+4e^- \qquad (2)$$

During operation, the products from reactions (1) and (2) are immediately swept downstream of the electrodes, preventing transport and recombination of the $H^+$ and $OH^-$ ions that would normally occur in a stagnant electrolyte in the absence of a membrane. By varying operating parameters such as the current density passed through the electrodes and the flow rate of the electrolyte through the electrolyzer cell, it is possible to produce acid and base at a desired pH.

Figure 5A:
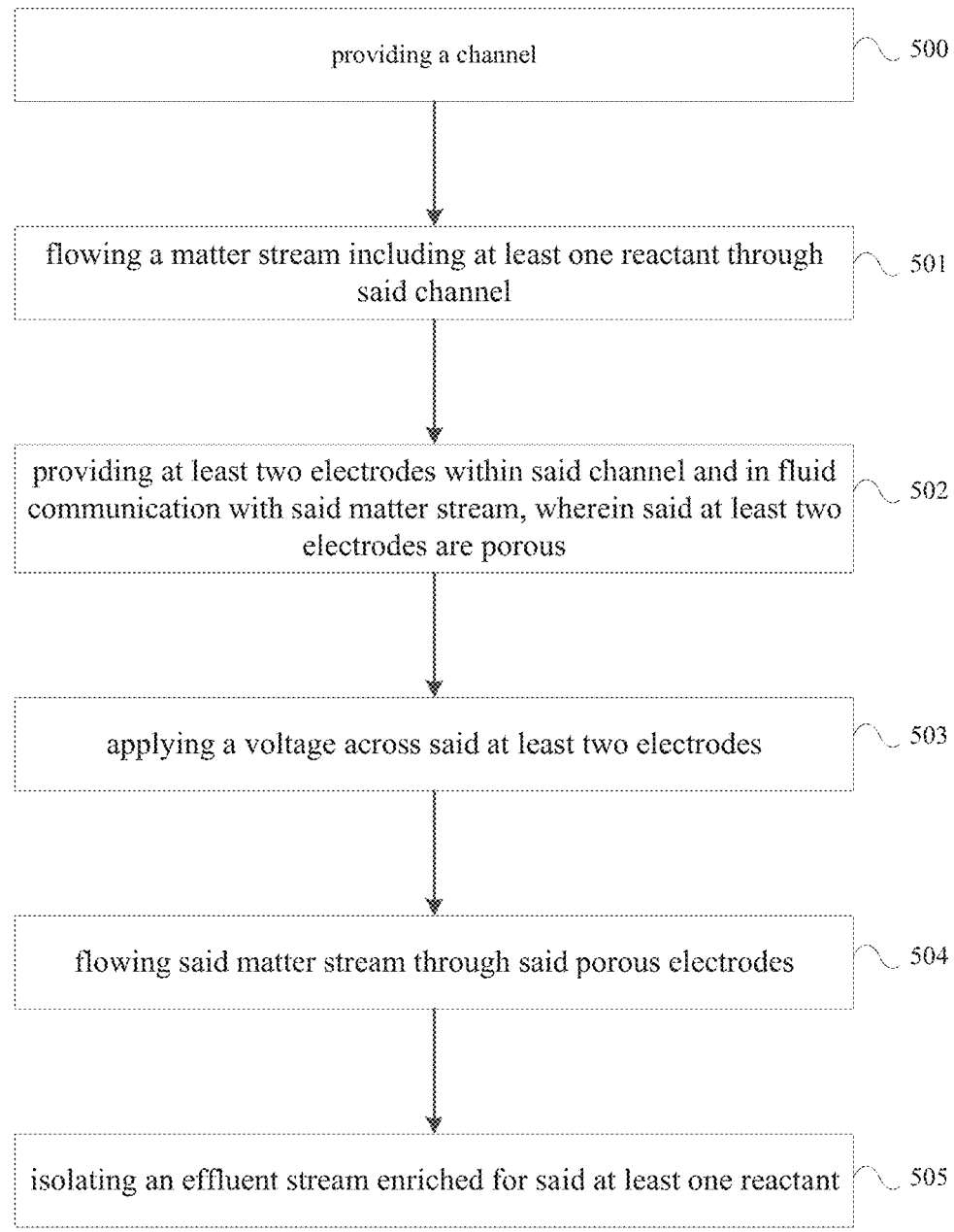
FIG. 5A portrays a method of using the system portrayed in FIG. 1A.

In some embodiments, the present disclosure is also directed to methods of electrochemically producing at least one product. As portrayed in FIG. 5A, in some embodiments a method comprises providing 500 a channel. In some embodiments, the method comprises flowing 501 a matter stream including at least one reactant through the channel. In some embodiments, the method comprises providing 502 at least two electrodes within the channel and in fluid communication with the matter stream. The electrodes are porous and thus allow at least a portion of the matter stream to flow through it. As discussed above, the channel can be of any suitable shape and size to allow flow of the matter stream to the electrodes disposed in that channel.

In some embodiments, the method comprises applying 503 a voltage across the at least two electrodes. In some embodiments, the method comprises the step of flowing 504 the matter stream through the porous electrodes. In some embodiments, the method comprises isolating 505 an effluent stream enriched for the at least one reactant.

Figure 5B:
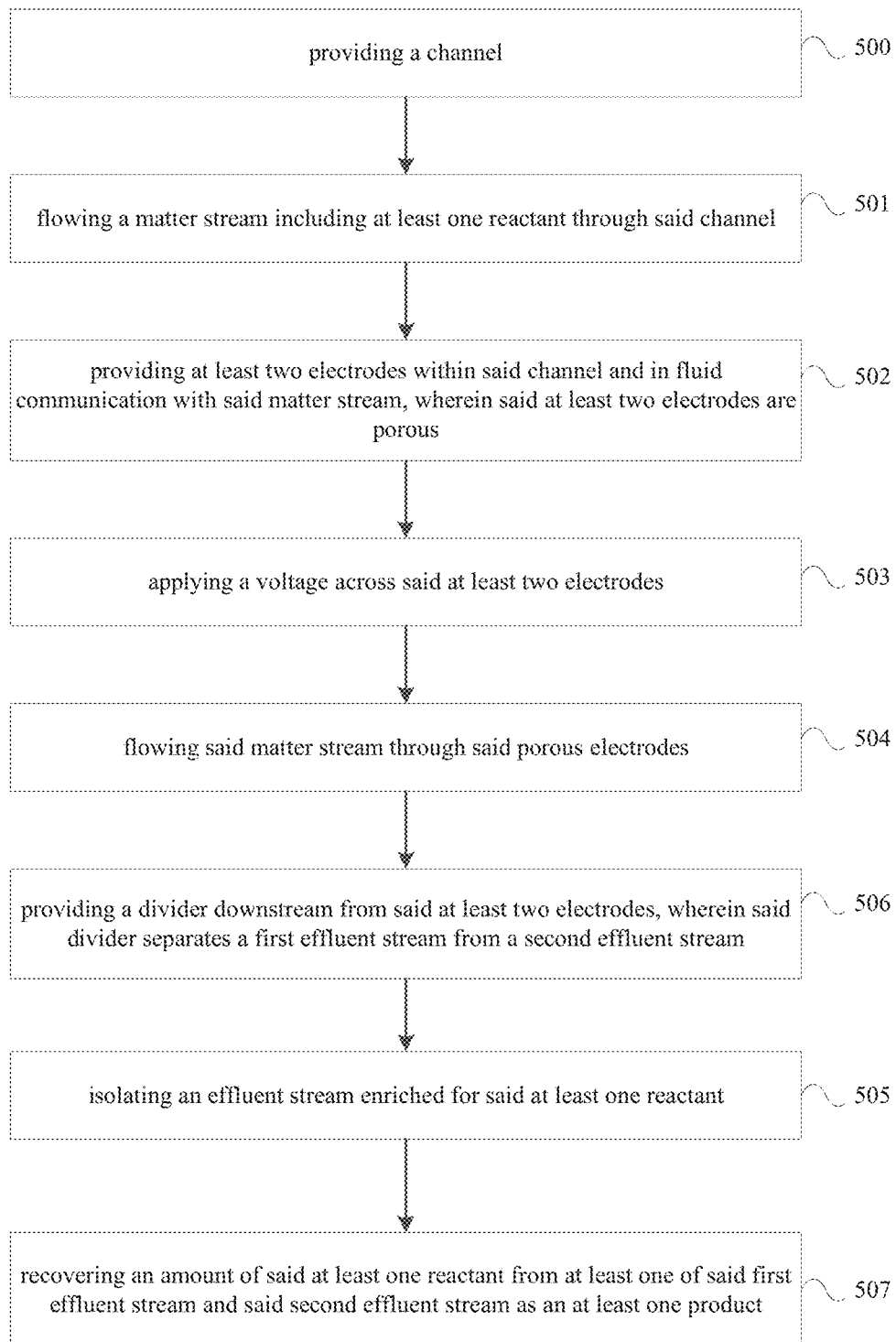
FIGS. 5B-5C portray further embodiments of the method portrayed in FIG. 6A.

As portrayed in FIG. 5B, in some embodiments, the method further comprises providing 506 a divider downstream from the at least two electrodes. In some embodiments, divider is any suitable shape and size to separate a first effluent stream from a second effluent stream. In some embodiments, the method further comprises recovering 507 an amount of the at least one reactant from at least one of the first effluent stream and the second effluent stream as an at least one product. As mentioned above, in some embodiments the product is an acid. In some embodiments, the product is a base.

Figure 5C:
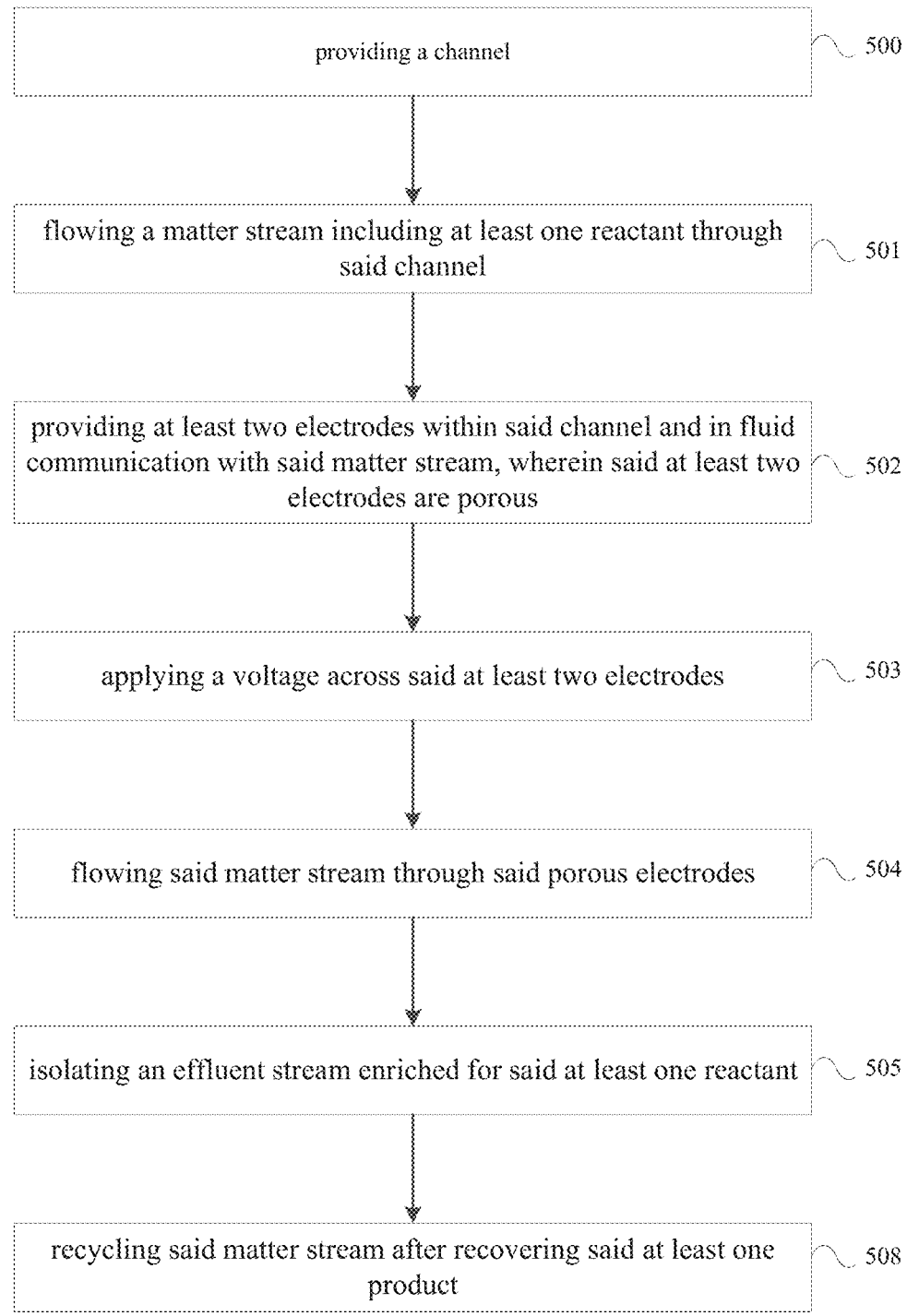

As portrayed in FIG. 5C, in some embodiments, the method further comprises recycling the matter stream after products have been recovered or removed.

Figure 6A:
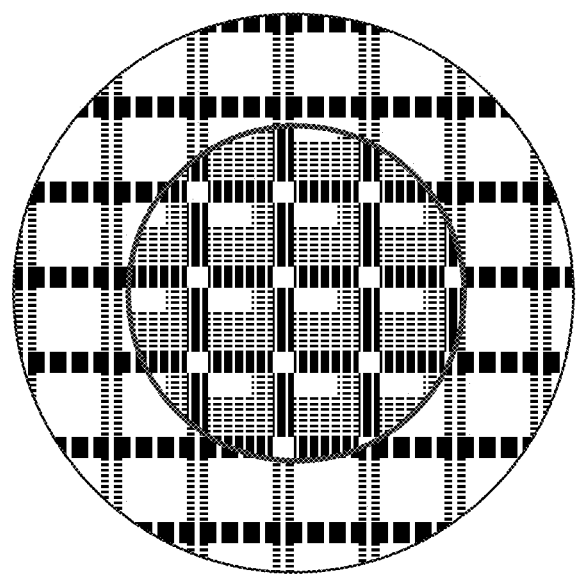
FIGS. 6A and 6B portray electrodes for use in the system portrayed in FIG. 1A.
Figure 6B:
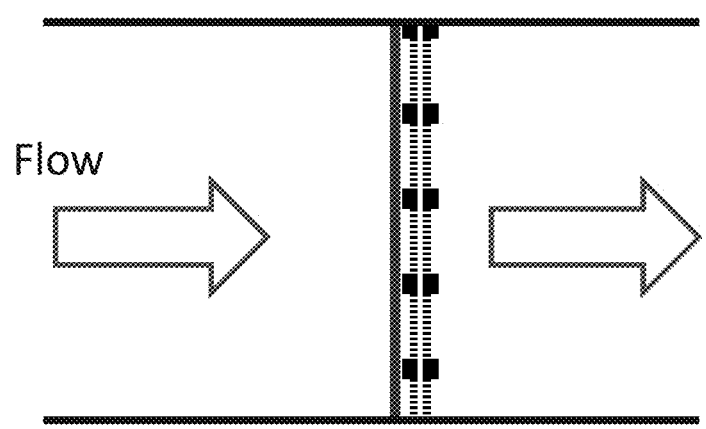

In some embodiments, such as those portrayed at FIG. 6A and 6B, catalyst is included on at least one of electrode 105 and 106. The spatial distribution of catalyst on the electrode surfaces can be designed so as to enhance the rate of desired reactions and suppress the rates of undesirable reactions. Referring to FIG. 6A, in some embodiments, catalyst is applied only to a portion of the electrode. Catalyst material only applied to the center of the flow through electrode concentrates catalyst where the electrolyte velocity is greatest. Such a design would be beneficial for certain velocity profiles where product species will move at a slower speed closer to the walls of the reactor, and short pulsed power times are required due to close electrode spacing.

Referring to FIG. 6B, in some embodiments, catalyst is disposed on one side of the electrode. The electrode side including catalyst can be either upstream or downstream. Having the catalyst only on one side of the flow-through electrode would lead to a slight increase in solution resistance, but would produce the product species directly in the desired collection channel, minimizing product cross-over even further. This would be especially beneficial for gaseous bubbles, which would experience a steric hindrance to cross over if the size of the pores in the flow through electrode is smaller than the average size of gas bubbles upon detachment. Product separation may also be facilitated by pulsing the applied power to the electrodes and/or pulsing the electrolyte flow rate.

In this embodiment, the electrolyzer has been fabricated by 3D printing and the electrodes utilized in this cell are platinized titanium mesh arranged at an angle of 180° to each other. The electrodes are 0.6 $cm^2$ in length and have a cross sectional area of 0.24 $cm^2$.

Figure 8:
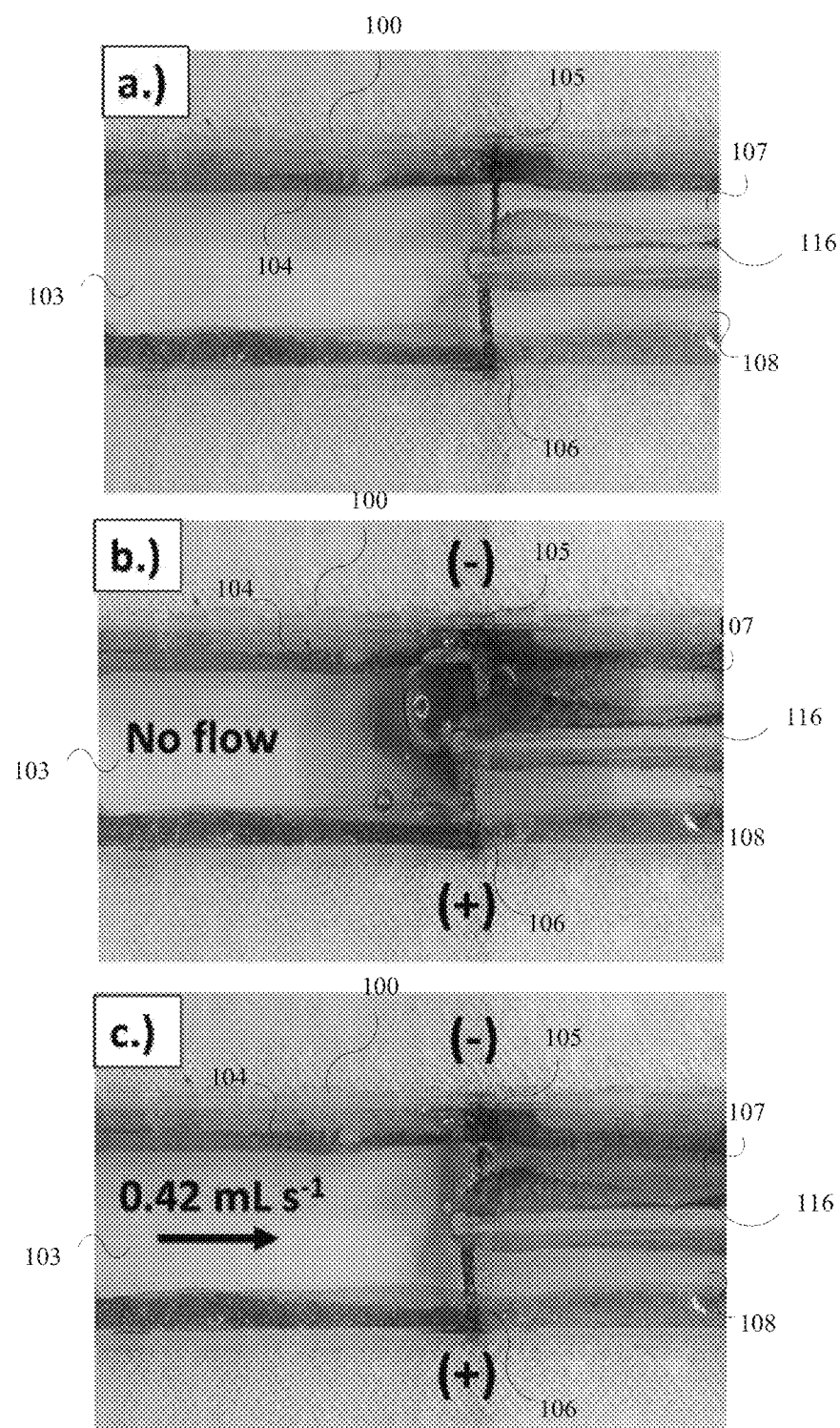
FIG. 8 portrays catholyte and anolyte effluent stream separation by a membraneless electrochemical flow-through reactor according to some embodiments of the disclosed subject matter as measured by pH.

The catalytic activity of the platinized electrodes towards the hydrogen and oxygen evolution reactions (Eq. 1 and 2, respectively) was evaluated outside the flow cell by means of cyclic voltammetry (CV) in a 0.5 M $H_2SO_4$, 1 M $Na_2SO_4$ (adjusted to pH 7) and 1 M $KNO_3$ (pH 7) electrolytes (FIG. 8). Cyclic voltammograms were conducted in two-electrode a.-c.) and three-electrode d.-f.) arrangements in 1M Potassium Nitrate, 1M Sulfuric acid, and 1M Sodium sulfate. Referring to FIG. 3B, Tafel analysis of $iR_S$-corrected LSV curves of electrodes indicate the kinetic overpotential loss associated the hydrogen evolution reaction (HER) was relatively small with a measured overpotential loss of 190 mV at 100 mA $cm^{31\ 2}$. The kinetic overpotential loss associated with the oxygen evolution reaction (OER) was much higher at 840 mV at 100 mA $cm^{-2}$. This reflects poor kinetics of platinized titanium for OER in acidic solutions.

Figure 7:
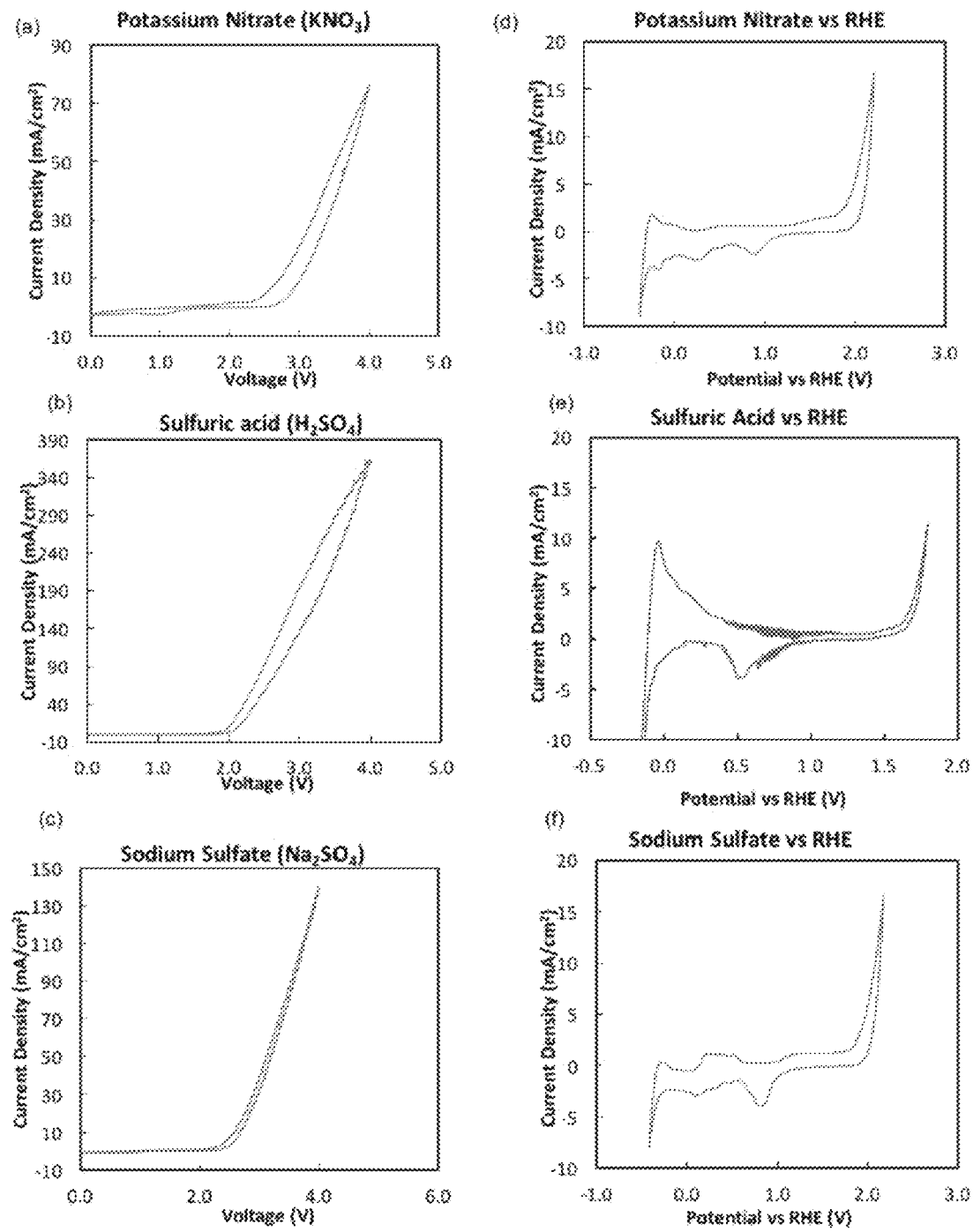
FIG. 7 portrays cyclic voltammograms conducted in two-electrode (graphs a-c) and three-electrode (graphs d-f) embodiments of the membraneless electrochemical flow-through reactor shown in FIG. 1A.

The electrodes were also characterized in all the electrolyte solutions listed above using a two electrode arrangement with a platinized titanium mesh as a counter electrode. pH 7 solutions were used in this experiment as pH changes are easier to measure when starting with a neutral pH solution. As observed in FIG. 7 in graphs a, b and c, the current density recorded in $H_2SO_4$ is much higher than the densities in $Na_2SO_4$ and KOH. This is because platinum operates at a higher efficiency in low pH solutions. Hence, as the pH of the solution increases the measured current density and efficiency of the platinum catalyst decreases.

Figure 9:
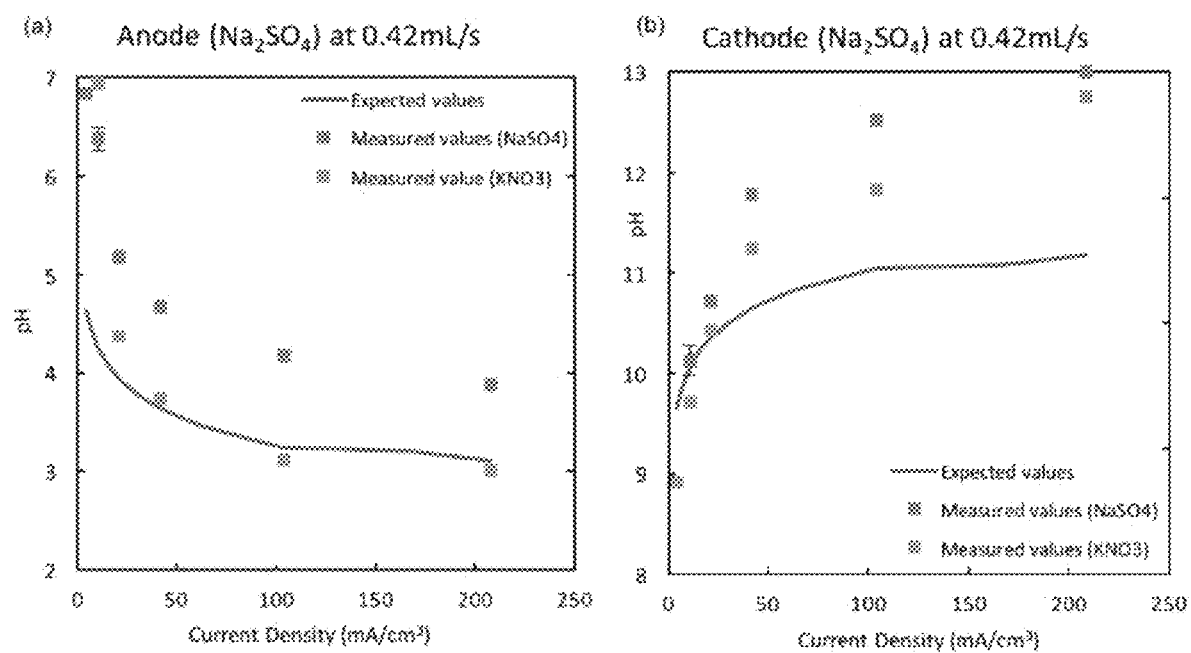
FIG. 9 portrays recorded pH of flow streams through the membraneless electrochemical flow-through reactor in FIG. 1A at various current densities and flow rates in $KNO_3$ and $Na_2SO_4$.

Referring to FIG. 8, to visualize the product crossover between the anolyte and catholyte effluent streams in the electrolyzer, the electrolysis process was conducted using a 1.0 M $KNO_3$ solution in the presence of a universal pH indicator, which is a pH-sensitive dye. The measurements were carried out at a current density of 62.5 mA cm$^{-2}$ and at a flow rate of 0.42 mL s$^{-1}$. A pH neutral electrolyte was chosen for this experiment because of its poor buffering capabilities, therefore changes in the electrolyte pH occurred solely as a result of OER and HER reactions taking place in the electrolyzer. FIG. 8 shows a picture of the electrolyzer loaded with the pH-sensitive dye, which has a green color indicating a neutral solution (pH 7) of KNO$_3$, prior to electrolysis. Colorimetric analysis for qualitatively viewing pH differences of the anode and effluent product streams using a universal pH indicator: (a) Electrolysis cell operating at 0.42 mL s$^{-1}$ and 0 mA cm$^{-2}$, (b) shows the cell operating 0.42 mL s$^{-1}$ and 62.5 mA cm$^{-2}$, and (c) shows the cell operating at 0 mL s$^{-1}$ and 62.5 mA cm$^{-2}$. When current is applied to the electrodes in a stagnant electrolyte, the electrolyte around the cathode assumes a characteristic purple color (pH>11) due to the formation of OH$^-$ through the HER, while a pink color (pH<4) appears around the anode as a result of higher proton concentration resulting from the OER. Because the electrolyte is stagnant, the alkaline (purple) and acidic (pink) product plumes are observed to quickly overlap, with a narrow green line (neutral pH) at the boundary where the access H$^+$ and OH$^-$ in the two plumes recombine to form H$_2$O. This reaction, due to acid/base crossover between the electrodes, represents an undesirable loss, and occurs simultaneously with undesirable crossover of O$_2$ and H$_2$ product. Both H$_2$ and O$_2$ product gas bubbles are visible in FIG. 8, with the net volume of gaseous H$_2$ bubbles far exceeding that of the O$_2$ bubbles due to the reaction stoichiometry and differences in the solubility of O$_2$ and H$_2$. In contrast to the behavior observed in the stagnant electrolyte, operation of the electrolyte under a flow rate of 0.42 mL s$^{-1}$ results appears to eliminate product crossover and minimize bubble build-up at the electrode surface. As shown in FIG. 9, the flowing electrolyte serves to sweep the product species from left to right such that the purple and pink product plumes remain confined to the cathode and anode effluent channels, respectively. Comparing these images illustrates how flowing electrolyte is essential to avoid product crossover and maximize the pH difference between the anolyte and catholyte streams of the membraneless electrolyte.

By varying the flow rate of electrolyte through the cell and the current applied through the electrodes a pH difference between the two product streams (anolyte effluent and catholyte effluent) can be achieved. To predict the resultant pH of both streams, Faraday's law in conjunction with the electrolyte flow rate can be utilized:

$$[H^+] = 10^{-pH} = \frac{\text{Rate of } H^+ \text{ generation}}{\text{Fluid Flow Rate}} = \frac{\left(\frac{J \cdot A}{n \cdot \varepsilon}\right)}{v} \quad (3)$$

where, J is the current density (C s$^{-1}$ cm$^{-2}$), A is the cross sectional area of the effluent channel (cm$^2$), n is the number of electrons involved in the redox reaction, F is Faraday's constant (96485 C mole$^{-1}$), and v is the volumetric flow rate (cm$^3$ s$^{-1}$).

In order to determine the pH change between the neutral inlet stream and the effluent streams, the two effluent streams were separately collected and their pH analyzed using a commercial pH probe. The electrolyzer was operated using two different reactant solutions (1.0 M KNO$_3$ and 1.0 M Na$_2$SO$_4$), for which the initial pH was adjusted to a value of approximately 7 for all experiments performed. In these experiments, the effect of flow rate and current density on the pH of the catholyte and anolyte streams was measured. FIG. 9 show the measured pH as a function of current density at a constant flow rate of 0.42 mL s$^{-1}$ for the anode and cathode streams respectively, using 1.0 M KNO$_3$ as the electrolyte.

Figure 10:
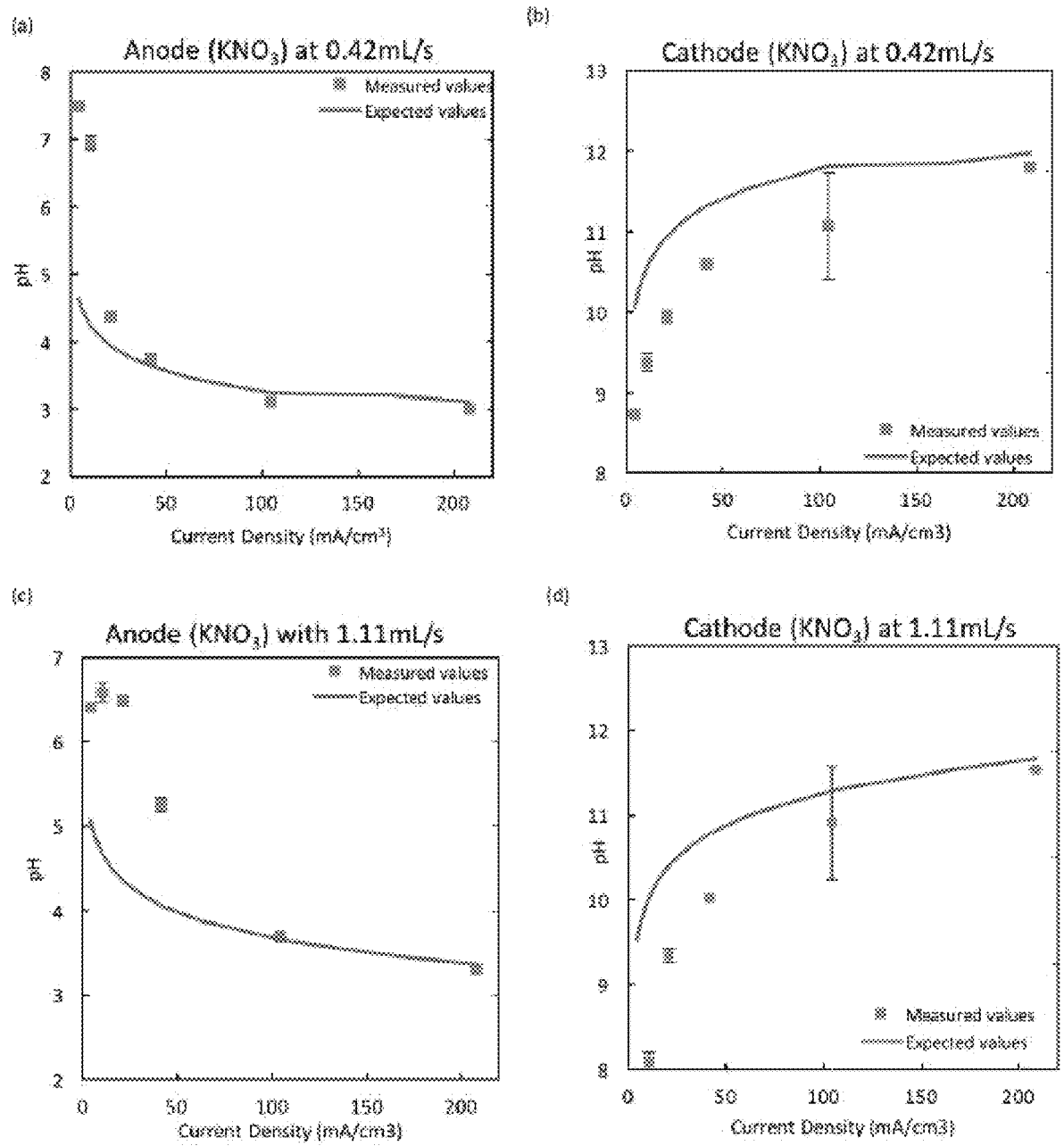
FIG. 10 portrays pH measurements of flow streams through the membraneless electrochemical flow-through reactor in FIG. 1A at various current densities and flow rates in $KNO_3$.

As expected, the pH of the cathode stream increases with increasing current density (Eq. 3), and the pH of the anode stream decreases with increasing current density. As shown in FIG. 10, the measured pH values agree well with the calculated values on both the anode and cathode streams at the higher current densities and using 1.0 M KNO$_3$ as the reactant. pH measurements at various current densities and flow rates in KNO$_3$: a.) anode and b.) cathode effluent stream pH values recorded while operating under a flow rate of 0.42 mL s$^{-1}$; c.) anode and d.) cathode effluent stream pH values recorded while operating the cell at a higher flow rate (1.11 mL s$^{-1}$) The last data point on graphs a and b (at 208 mA cm$^{-2}$) was performed at 0.62 mL s$^{-1}$ due to poor bubble detachment from electrodes at 0.42 mL s$^{-1}$. The change in flow rate is accounted for in the predicted values. At low flow rates and high current densities, gaseous bubbles build up on the electrodes surface leading to decreased device efficiency due to a higher cell resistance and lack of fresh electrolyte being delivered to the Pt—Ti mesh. The expected pH values were calculated based on the electrolyte flow rate and applied current density. However, significant differences between the predicted and measured pH values are observed for the anode stream at lower current densities. On the cathode stream (graph b), the measured pH values are higher than the expected value at current densities higher than 40 mA cm$^{-2}$. The activity coefficient of protons in KNO$_3$ and Na$_2$SO$_4$ has not been accounted for in the pH calculation above (Eq. 3), this is suspected to be the reason for the pH differences between the measured and calculated values. Including the activity coefficient value to the equation will give higher pH values which will agree better with the measured values.

In order to determine the effect of flow rate on the measured pH, the electrolyzer was operated at a higher flow rate of 1.11 mL s$^{-1}$ in KNO$_3$ (FIG. 9, graphs c and d). This is used as the electrolyte for this experiment as no significant oxidation/reduction of nitrates occurred at the higher current densities. Graph c (the anodic stream) indicates the pH difference between the predicted and measured values decreases as the current density increases as also observed at 0.42 mL s$^{-1}$. The pH differences between the measured and calculated values also increases at 1.11 mL s$^{-1}$ suggesting there is a limit on the amount of acid/base that can be produced at low current densities. The trend observed in graph d (cathode channel) is also similar to that observed while operating the cell at a lower flow rate.

Referring to FIG. 9, in order to determine if the supporting electrolyte had an effect on the measured pH, the experiments were repeated using 1.0 M Na$_2$SO$_4$ as the electrolyte. FIG. 9, graph a shows a significant pH difference between the calculated (expected) and measured values at the anode stream while using Na$_2$SO$_4$ as the supporting electrolyte. This is believed to be as a result of the oxidation of the sulphate ions to persulphate ions at the higher current densities (Eq. 4). This would lead to higher pH values being recorded on the anode stream of the electrolyzer as observed in graph a, caused by a decrease in the Faradaic efficiency of the oxygen evolution reaction (Eq. 2).

$$S_2O_8^{2-} + 2e^- \rightarrow 2SO_4^{2-} \quad E_{ox}^0 = 2.01V \quad (4)$$

The pH measurement for the cathode channel while using $Na_2SO_4$ as the electrolyte graph b shows similar results to those recorded with $KNO_3$ indicating both figures show true values. The differences seen between the measured and predicted pH are also attributed to the activity coefficient of protons in $Na_2SO_4$.

The error bars on most measurements are small, indicating the results are reproducible. The error associated with the pH meter used in this experiment has not been accounted for, which could also result in higher pH differences between the measured and calculated values.

All solutions were prepared using 18.2 MΩ cm water. Concentrated sulfuric acid (Certified ACS plus, Fisher Scientific Company, Fair Lawn, N.J.), sodium sulfate (ACS Reagent grade, Sigma-Aldrich Co., St. Louis, Mo.), potassium tetrachloroplatinate (99.99% trace metals basis, Sigma-Aldrich Co., St. Louis, Mo.) and potassium nitrate (ReagentPlus 99.0%, Sigma-Aldrich Co., St. Louis, Mo.) were utilized in this project. The electrolyzer was 3D printed (MAKERBOT®, MakerBot Industries, LLC, Brooklyn, N.Y.) from natural color poly(lactic acid) (PLA) filaments. The electrodes were made from titanium mesh (80 mesh; 130 μm wire diameter), purchased from Alfa Aesar, Ward Hill, Mass., and were cut using titanium scissors to an appropriate size. JB Weld 5-minute epoxy (J-B Weld Company, Atlanta, Ga.) was used to seal the electrodes and glass window in place on the electrolyzer body.

The body of the electrolyzer was designed using the AutoDesk Inventor Professional CAD software v2016 (Autodesk, Inc., San Rafael, Calif.). The electrolyzer cell was printed on a MakerBot replicator 2.0 3D printer (MakerBot Industries, LLC, Brooklyn, N.Y.) using PLA filaments. The cell was 3D printed at high resolution, with a 0.1 mm layer height and a 15% infill. The fluidic channel of the flow cell was 7.0 cm long, 1.3 cm wide and 0.5 cm high, with a 3.3 cm by 0.1 cm product divider placed downstream of the electrodes. The cross-section of each product channel was 0.5 by 0.6 cm. The inlet and outlets were 4.0 mm ID. The computer aided design (CAD) file for this electrolyzer is freely available at echem.io. The electrolyzer was assembled by positioning two platinized titanium mesh electrodes at a 180° angle to each other within the printed flow cell. A transparent glass window was placed on the top of the electrolyzer in order to visualize pH changes with a universal pH indicator color changing dye. The Pt/Ti mesh electrodes and glass windows were epoxied to the cell body and given at least 24 hours to set.

Before platinization, the titanium mesh electrodes were cleaned using double-step chronoamperometry in 0.5 M $H_2SO_4$. Platinum electrodeposition was carried out by means of CV, with the applied potential cycled 20 times between 0.3 and −0.7 V vs. Ag/AgCl in a solution of 3 mM $K_2PtCl_4$ and 0.5 M NaCl (pH=3.1).

All experiments were performed using a Biologic SP-300 or -200 bi-potentiostat/galvanostat. Electrode and electrolyzer performance were characterized by CV and electrochemical impedance spectroscopy. The catalytic activity of the platinized electrodes towards the hydrogen and oxygen evolution reactions (Eq. 1 and 2, respectively) was evaluated outside the flow cell by means of CV in a 0.5 M $H_2SO_4$ electrolyte. A three electrode arrangement was utilized with Ag|AgCl half-cell as the reference electrode, and a graphite rod as the counter electrode. All solutions were pumped using a Cole Parmer Masterflex L/S peristaltic pump equipped with an Easy Load II pump head. A home-built dampener was used in all experiments to reduce the level of noise caused by the pulse-flow of the peristaltic pump.

pH measurements were performed using a Fisher Scientific Education bench-top pH meter. The pH meter is calibrated with pH 4.01, 7 and 10.01 buffer solutions (Oakton) at the start of all experiments. The downstream products from the anode and cathode streams were collected in beakers, which were placed directly below the outlets of the flow cell.

Activity coefficients were determined by making solution of known concentrations of acid ($HNO_3$) and base (KOH) and mixing this with a fixed volume of 1M solution of $KNO_3$. The pH of the resultant mixture was then measured and a plot of the pH against concentration of acid/base was made.

Figure 11:
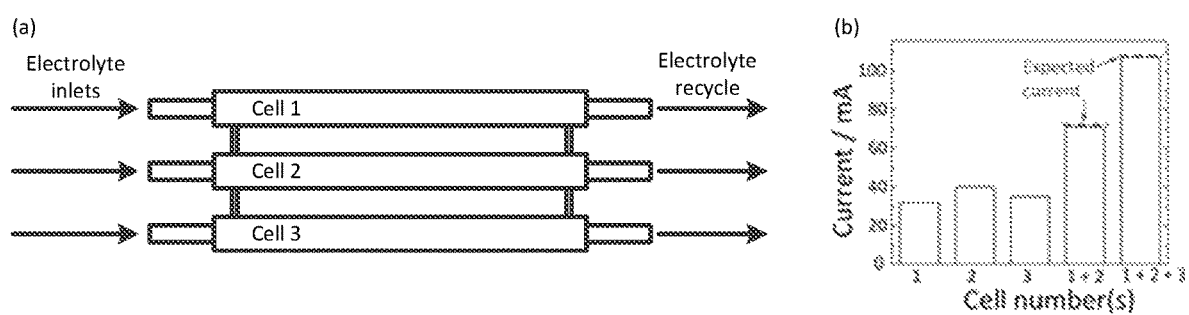
FIG. 11 portrays an exemplary embodiment of the membraneless electrochemical flow-through reactor demonstrating the modularity of the systems described in the present disclosure.

Referring to FIG. 11, overall, the membraneless flow reactor concept is scalable, modular and suitable for a variety of high volume processes. The fast resupply of reactant and removal of product also provides thermodynamic (Nernstian) benefits, decreasing the voltage required for non-spontaneous reactions while increasing the voltage output from spontaneous electrochemical reactions. A prototype device in modular stacked configuration is shown in FIG. 11. In some embodiments, system 1 is incorporated into a home-scale energy storage system. An array of photovoltaic (PV) cells installed in a suitable location for catching sunlight are installed. Excess electricity generated by PV cells is directed to a system 1, which utilizes at least one membraneless electrochemical flow-through reactor 100 to split water into $H_2$ and $O_2$ product streams. $H_2$ product is stored to subsequent use in the production of electricity, such as in a fuel cell, or as a fuel for a generator.

With higher current densities, the pH difference between the anode and cathode streams can be maximized, leading to more applications of this electrolyzer in various industries.

Although the disclosed subject matter has been described and illustrated with respect to embodiments thereof, it should be understood by those skilled in the art that features of the disclosed embodiments can be combined, rearranged, etc., to produce additional embodiments within the scope of the invention, and that various other changes, omissions, and additions may be made therein and thereto, without parting from the spirit and scope of the present invention.

What is claimed is:

1. An electrochemical flow-through reactor comprising:
   a channel for containing and directing flow of a matter stream, wherein said matter stream includes at least one reactant;
   at least one anode and at least one cathode positioned laterally adjacent and obliquely to each other at a location within said channel and extending longitudinally along said channel; and
   a plurality of effluent flow channels downstream of said channel, said plurality of effluent flow channels separated by a divider, and said at least one anode and said at least one cathode separated by the divider,
   wherein said oblique at least one anode and at least one cathode are porous, in fluid communication with said matter stream, connected to the divider and a wall of said channel, and arranged within said channel such that said matter stream flows through said at least one anode and at least one cathode.

2. The electrochemical reactor according to claim 1, wherein the angle between said at least two oblique electrodes is from about 30 degrees to about 180 degrees.

3. The electrochemical reactor according to claim 1, wherein a plurality of electrochemical flow-through reactors are arranged in series and in fluid communication.

4. The electrochemical reactor according to claim 1, wherein at least one electrode includes a catalyst.

5. The electrochemical reactor according to claim 4, wherein said catalyst is applied to only a portion of said at least one electrode.

6. The electrochemical reactor according to claim 5, wherein said catalyst is only applied on one side of said at least one electrode.

7. The electrochemical reactor according to claim 1, wherein at least one electrode is mesh shaped as a ring, wire, disk, band, or plate.

8. The electrochemical reactor according to claim 1, further comprising an anolyte product collector and a catholyte product collector in fluid communication with said channel.

9. The electrochemical reactor according to claim 1, wherein said channel has an annular conformation comprising a porous central conduit and an outer wall, wherein said at least two oblique electrodes are disposed radially between said central conduit and said outer wall.

10. The electrochemical reactor according to claim 1, wherein said matter is selected from the group consisting of: gas, liquid, and mixed-phase electrolyte.

11. The electrochemical reactor according to claim 1, wherein said matter is an electrolyte.

12. The electrochemical reactor according to claim 1, wherein said oblique at least one anode and at least one cathode are not separated by a membrane.

* * * * *